US011627634B2

(12) United States Patent
Toeda et al.

(10) Patent No.: US 11,627,634 B2
(45) Date of Patent: Apr. 11, 2023

(54) RADIO ACCESS SYSTEM AND COMMUNICATION DEVICE

(71) Applicant: NTT DOCOMO, INC., Tokyo (JP)

(72) Inventors: Teruaki Toeda, Tokyo (JP); Tooru Uchino, Tokyo (JP); Kenji Kai, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 17/265,366

(22) PCT Filed: Aug. 8, 2018

(86) PCT No.: PCT/JP2018/029846
§ 371 (c)(1),
(2) Date: Feb. 2, 2021

(87) PCT Pub. No.: WO2020/031310
PCT Pub. Date: Feb. 13, 2020

(65) Prior Publication Data
US 2021/0298116 A1 Sep. 23, 2021

(51) Int. Cl.
H04W 76/30 (2018.01)
H04W 80/02 (2009.01)

(52) U.S. Cl.
CPC .......... H04W 76/30 (2018.02); H04W 80/02 (2013.01)

(58) Field of Classification Search
CPC .... H04W 76/30; H04W 80/02; H04W 88/085
See application file for complete search history.

(56) References Cited

U.S. PATENT DOCUMENTS

| 9,661,482 | B2* | 5/2017 | Takahashi | H04W 52/0235 |
| 9,967,858 | B2* | 5/2018 | Bangolae | H04W 76/27 |
| 2009/0005095 | A1* | 1/2009 | Chun | H04W 76/20 |
| | | | | 455/509 |
| 2014/0313987 | A1 | 10/2014 | Zhang et al. | |
| 2015/0373733 | A1* | 12/2015 | Bangolae | H04W 72/087 |
| | | | | 370/329 |
| 2017/0111879 | A1* | 4/2017 | Li | H04W 76/30 |
| 2017/0208488 | A1 | 7/2017 | Hwang et al. | |
| 2019/0182716 | A1* | 6/2019 | Futaki | H04W 76/10 |
| 2020/0077253 | A1* | 3/2020 | Kim | H04W 76/30 |
| 2020/0383164 | A1* | 12/2020 | Kim | H04W 76/11 |

FOREIGN PATENT DOCUMENTS

JP 2016519529 A 6/2016

OTHER PUBLICATIONS

International Search Report issued in PCT/JP2018/029846 dated Sep. 25, 2018 (3 pages).
Written Opinion of the International Searching Authority issued in PCT/JP2018/029846 dated Sep. 25, 2018 (4 pages).
(Continued)

Primary Examiner — Will W Lin
(74) Attorney, Agent, or Firm — Osha Bergman Watanabe & Burton LLP

(57) ABSTRACT

When RRC connection release in a radio resource control layer reaches UE (200A), gNB-DU (110) transmits UE CONTEXT RELEASE COMPLETE of the UE (200A) to gNB-CU (120). The gNB-CU (120) releases a context allocated to the UE (200A) based on the UE CONTEXT RELEASE COMPLETE.

3 Claims, 7 Drawing Sheets

(56) References Cited

OTHER PUBLICATIONS

3GPP TS 38.473 V15.2.1; "3rd Generation Partnership Project; Technical Specification Group Radio Access Network; NG-RAN; F1 application protocol (F1AP) (Release 15)"; Jul. 2018 (161 pages).
3GPP TS 38.401 V15.2.0 "3rd Generation Partnership Project; Technical Specification Group Radio Access Network; NG-RAN; Architecture description (Release 15)" Jun. 2018 (38 pages).
Extended European Search Report issued in European Application No. 18929227.9, dated Feb. 22, 2022 (9 pages).
Office Action issued in Japanese Application No. 2020-535408; dated Aug. 30, 2022 (4 pages).
Office Action issued in Indonesian Application No. P00202101534; Dated Feb. 3, 2023 (7 pages).

\* cited by examiner

RADIO ACCESS SYSTEM AND COMMUNICATION DEVICE

TECHNICAL FIELD

The present invention relates to a radio access system that includes a plurality of communication devices, and the communication device.

BACKGROUND ART

3rd Generation Partnership Project (3GPP) specifies Long Term Evolution (LTE), and with the aim of further speeding, specifies LTE-Advanced (hereinbelow, the LTE includes the LTE-Advanced). Moreover, in the 3GPP, further, specification of a succeeding system of the LTE called 5G New Radio (NR) and the like is being considered.

In the NR, a configuration of a radio base station (gNB) that is split into a plurality of communication devices, specifically, Central Unit (gNB-CU) and Distributed Unit (gNB-DU) that is arranged at a distance from an installation location of the gNB-CU is being stipulated.

The gNB-CU includes a radio resource control layer (RRC) and a packet data convergence protocol layer (PDCP), whereas the gNB-DU includes a radio link control layer (RLC) and layers below thereof. The gNB-CU and the gNB-DU are connected via F1 interface.

The gNB-CU is stipulated to be capable of transmitting UE CONTEXT RELEASE COMMAND, which includes RRC-Container (RRCRelease), to the gNB-DU at the time of releasing a connection with a user equipment (UE) in the RRC (see Non-Patent Document 1). The gNB-DU forwards to the UE an RRC message (RRCRelease) via the lower layers.

PRIOR ART DOCUMENT

Non-Patent Document

Non-Patent Document 1: 3GPP TS 38.473 V15.2.1 3rd Generation Partnership Project; Technical Specification Group Radio Access Network; NG-RAN; F1 application protocol (F1AP) (Release 15), 3GPP, July 2018

SUMMARY OF THE INVENTION

However, the following problems occur when releasing a connection in RRC. Specifically, according to the current 3GPP specifications (TS 38.473), when the gNB-DU receives the UE CONTEXT RELEASE COMMAND from the gNB-CU, there is a possibility that signaling and resources relating to the UE are released and the UE CONTEXT RELEASE COMPLETE is returned to the gNB-CU, regardless of whether the UE has actually received the RRCRelease that is included in the RRC-Container, in other words, whether the UE has received the RRCRelease normally.

Because the UE that has received the RRCRelease does not particularly return the RRC message, there is a possibility that the gNB-CU cannot recognize whether the UE has normally received the RRCRelease, and releases the resources.

Therefore, because the released resources of the UE are allocated to other UEs, when the RRCRelease that is included in the RRC-Container has not reached the UE, there is a possibility that a resource allocation conflict may occur and communication quality may deteriorate.

Therefore, the present invention has been made in view of the above circumstances. One object of the present invention is to provide a radio access system and a communication device capable of reliably avoiding a resource allocation conflict that arises when a user equipment cannot normally receive a message of the radio resource control layer in a configuration in which a radio resource control layer and layers below thereof are split and included in different communication devices.

According to one aspect of the present invention, a radio access system includes a first communication device (gNB-DU 110) that executes communication with a user equipment (UE 200A, UE 200B) via lower layers (for example, RLC); and a second communication device (gNB-CU 120) that is connected to the first communication device and executes communication with the user equipment via a radio resource control layer that is above the lower layers. The first communication device includes a transmitting unit that transmits to the second communication device a context release completion message (UE CONTEXT RELEASE COMPLETE) of the user equipment when a connection release message (RRCRelease) in the radio resource control layer reaches the user equipment. The second communication device includes a controlling unit that releases a context allocated to the user equipment based on the context release completion message.

A communication device according to another aspect of the present invention is a communication device (gNB-DU 110) that executes communication with a user equipment via a lower layer, and connects to another communication device (gNB-CU 120) that executes communication with the user equipment via a radio resource control layer that is above the lower layer. The communication device includes a transmitting unit that transmits to the other communication device a context release completion message of the user equipment when a connection release message in the radio resource control layer reaches the user equipment.

According to still another aspect of the present invention is a communication controlling method using a first communication device and a second communication device. The method includes executing in which the first communication device executes communication with a user equipment via lower layers; executing in which the second communication device that is connected to the first communication device executes communication with the user equipment via a radio resource control layer above the lower layers; transmitting in which the first communication device transmits to the second communication device a context release completion message of the user equipment when a connection release message in the radio resource control layer reaches the user equipment; and releasing in which the second communication device releases a context allocated to the user equipment based on the context release completion message.

MODES FOR CARRYING OUT THE INVENTION

Figure 1:
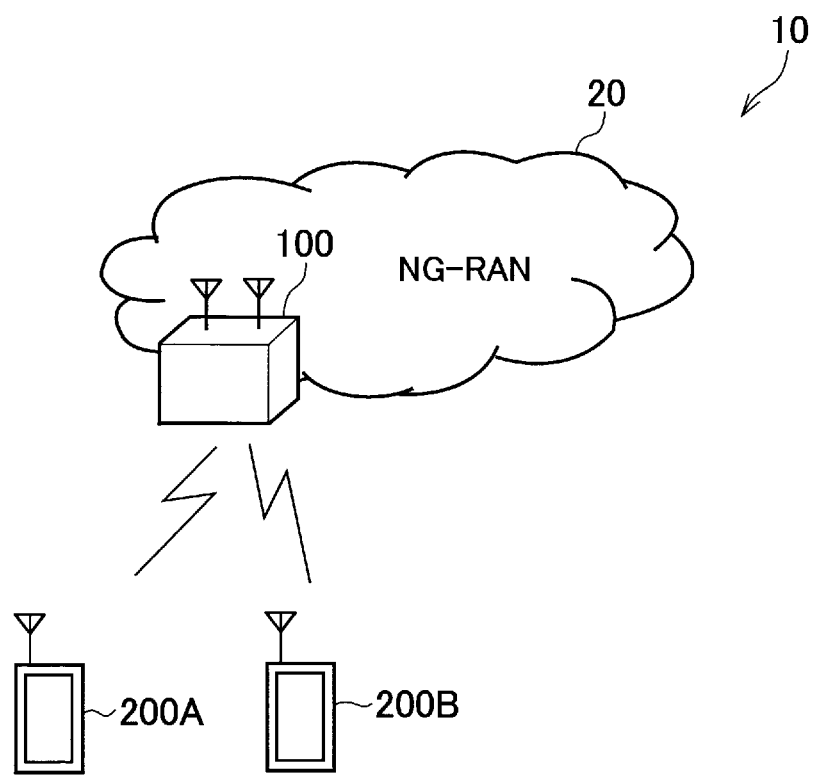
FIG. 1 is an overall schematic configuration diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) OVERALL SCHEMATIC CONFIGURATION OF RADIO COMMUNICATION SYSTEM

FIG. 1 is an overall schematic configuration diagram of a radio communication system 10 according to the present embodiment. The radio communication system 10 is a radio communication system according to 5G (NR).

As shown in FIG. 1, the radio communication system 10 includes Next Generation-Radio Access Network 20 (hereinafter, "NG-RAN 20"), a user equipment 200A (hereinafter, "UE 200A"), and a user equipment 200B (hereinafter, "UE 200B"). The NG-RAN 20 includes a radio base station 100 (hereinafter, "gNB 100"). A specific configuration of the radio communication system 10 including the number of the gNBs and the UEs is, however, not limited to the example shown in FIG. 1.

The NG-RAN 20 includes a plurality of NG-RAN Nodes, specifically, a plurality of the gNBs (or ng-eNBs). The NG-RAN 20 is connected to a not-shown core network (5GC) according to 5G specifications.

The gNB 100 is a radio base station according to the 5G specifications and executes radio communication with the UE 200A and the UE 200B in accordance with the 5G specifications. In the present embodiment, as explained later, the gNB 100 is constituted by Central Unit (gNB-CU) and Distributed Unit (gNB-DU).

By controlling the radio signals transmitted from a plurality of antenna elements, the gNB 100 and the UE 200A (UE 200B) can support technologies such as Massive MIMO that generates a beam having higher directivity, carrier aggregation (CA) that uses a plurality of component carriers (CC), and dual connectivity (DC) that simultaneously transmits the component carriers between the plurality of the NG-RAN Nodes and the UEs.

Figure 2:
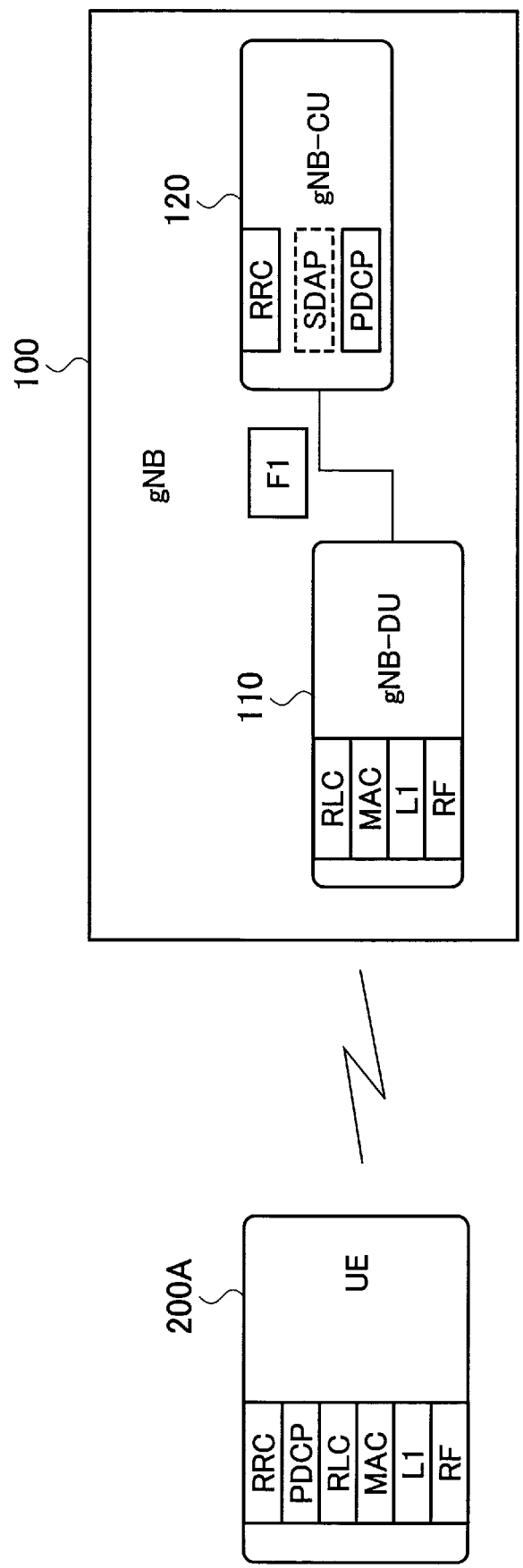
FIG. 2 is a diagram showing a protocol stack of gNB 100 and UE 200A.

FIG. 2 shows a protocol stack of the gNB 100 and the UE 200A. The UE 200A and the UE 200B include the same protocol stacks.

As shown in FIG. 2, the gNB 100 includes a gNB-Distributed Unit 110 (hereinafter, "gNB-DU 110") and a gNB-Central Unit 120 (hereinafter, "gNB-CU 120").

The gNB-DU 110 hosts lower layers, specifically, a physical layer (L1), a radio frequency unit (RF), a medium access control layer (MAC), and a radio link control layer (RLC).

The gNB-DU 110 executes communication with the UE 200A via the lower layers. In the present embodiment, the gNB-DU 110 constitutes a communication device, specifically, a first communication device.

The gNB-DU 110 supports one or more cells. One cell is only supported by one gNB-DU. The gNB-DU 110 terminates the F1 interface with the gNB-CU 120.

The gNB-CU 120 is a logical node that hosts a packet data convergence protocol layer (PDCP) and a radio resource control layer (RRC). The gNB-CU 120 can host a service data adaptation layer (SDAP).

The gNB-CU 120 controls operation of one or a plurality of the gNB-CUs 120. The gNB-CU 120 terminates the F1 interface with the gNB-DU 110.

In other words, the gNB-CU 120 is connected to the gNB-DU 110, and executes communication with the UE 200A via the RRC that is the upper layer of the lower layers such as the RLC. In the present embodiment, the gNB-CU 120 constitutes a second communication device (other communication device).

Moreover, in the present embodiment, the gNB-DU 110 and the one or more gNB-CU 120, that is, the gNB 100, constitute a radio access system.

The NG-RAN 20 that includes the gNB 100 having such a protocol stack completely controls the mobility of the RRC connection that is established with the UE 200A.

(2) FUNCTIONAL BLOCK CONFIGURATION OF RADIO COMMUNICATION SYSTEM

A functional block configuration of the radio communication system 10 will be explained below. Specifically, a functional block configuration of the gNB-DU 100 and the gNB-CU 120 will be explained here.

(2.1) gNB-DU 110

Figure 3:
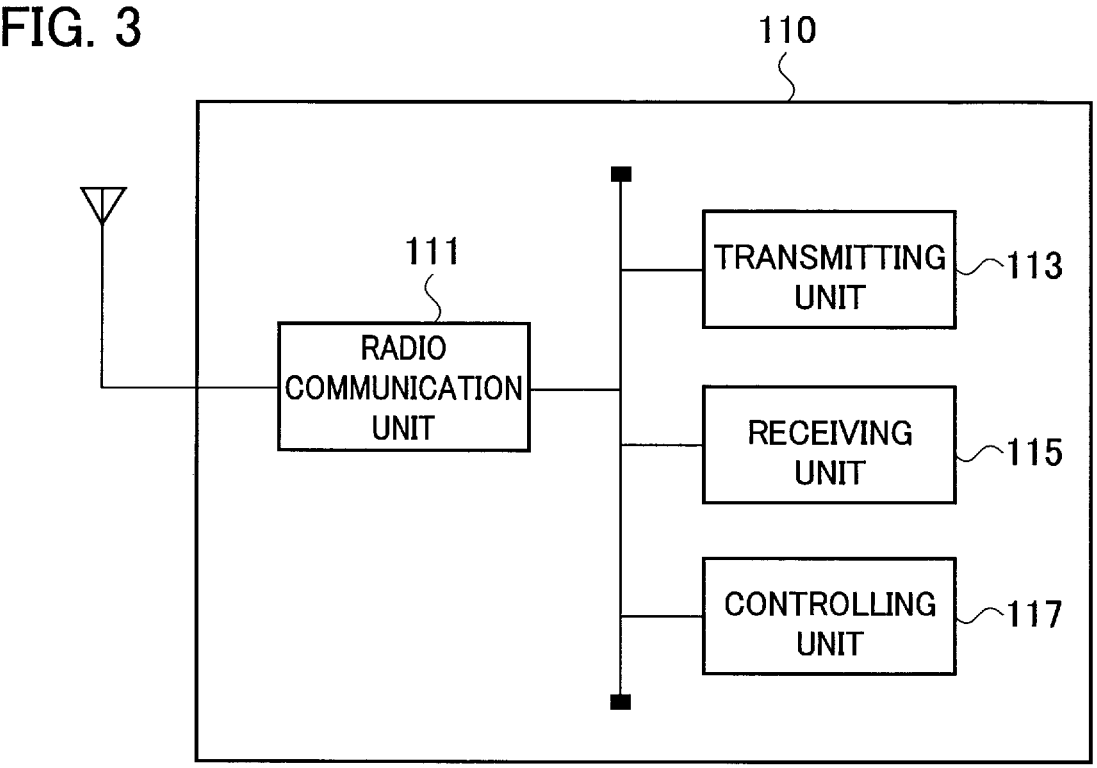
FIG. 3 is a functional block diagram of gNB-DU 110.

FIG. 3 is a functional block diagram of the gNB-DU 110. As shown in FIG. 3, the gNB-DU 110 includes a radio communication unit 111, a transmitting unit 113, a receiving unit 115, and a controlling unit 117.

The radio communication unit 111 transmits to the UE 200A (or to the UE 200B; hereinafter the same) a radio signal in a predetermined frequency band, and receives a radio signal transmitted from the UE 200A. RRC message, user data, and the like are multiplexed in the radio signal.

The transmitting unit 113 transmits to the gNB-CU 120 various messages according to the F1 interface, specifically, F1 Application Protocol (F1 AP). Particularly, in the present embodiment, when a connection release message in the RRC reaches the UE 200A, the transmitting unit 113 transmits to the gNB-CU 120 a context release completion message that indicates that the context release of the UE 200A is completed.

Specifically, when the connection release message in the RRC, that is, the RRCRelease, reaches the UE 200A, the transmitting unit 113 transmits to the gNB-CU 120 the context release completion message, that is, UE CONTEXT RELEASE COMPLETE, according to the F1AP.

Furthermore, signaling and resources, such as user data transport resources, used in the F1 interface relating to the UE 200A are included in the context of the UE 200A.

Moreover, as examples of the resources relating to the gNB-DU 110, individual resources, mainly, Physical Uplink Control Channel (PUCCH), Sounding Reference Signal (SRS), or the like can be cited. Moreover, as an example of the resources relating to the gNB-CU 120, mainly, ID (for example, gNB-CU UE F1 AP ID) can be cited.

Based on the result of the determination regarding whether the connection release message has reached the UE 200A obtained in the controlling unit 117, the transmitting unit 113 transmits the context release completion message to the gNB-CU 120 the UE 200A. Specifically, when the controlling unit 117 determines that the RRCRelease transmitted from the gNB-CU 120 has reached the UE 200A, the transmitting unit 113 transmits the UE CONTEXT RELEASE COMPLETE.

The receiving unit 115 receives from the gNB-CU 120 various messages according to F1 AP. Particularly, in the present embodiment, the receiving unit 115 receives from the gNB-CU 120 the UE CONTEXT RELEASE COMMAND via which release of the UE 200A context is instructed.

The controlling unit 117 controls the operation of the gNB-DU 110. Particularly, in the present embodiment, the controlling unit 117 determines whether the connection release message in the radio resource control layer, specifically, the RRCRelease, has reached the UE 200A. Furthermore, such determination can include deciding, verifying (confirming, acknowledging), estimating (assuming, presuming), or checking that the RRCRelease has reached the UE 200A.

In the present embodiment, based on the response message from the UE 200A in the layers below the RRC, the controlling unit 117 determines that the RRCRelease has reached the UE 200A. Alternatively, the controlling unit 117 can determine that the RRCRelease has reached the UE 200A by using a method other than that based on the response message in the lower layers.

Specifically, the controlling unit 117 can determine that the RRCRelease has reached the UE 200A by using one or more of the following determination conditions.

TABLE 1

| | Determination Condition |
|---|---|
| 1 | Reception of ACK in RLC layer |
| 2 | Reception of ACK in MAC layer |
| 3 | Estimation based on a fact that other message has reached |
| 4 | Estimation based on measured radio environment |
| 5 | A predetermined time period has elapsed from the reception of RRC message via radio communication |

As shown in TABLE 1, Determination Conditions 1 and 2 are specific examples of the response message transmitted from the UE 200A in the lower layers (RLC or MAC). In other words, based on the response message (Acknowledgement (ACK)) from the UE 200A in the lower layers (RLC or MAC), the controlling unit 117 determines that the RRCRelease from the gNB-CU 120 has successfully reached the UE 200A.

As long as it can be the basis for estimating that the RRCRelease has reached the UE 200A based on the messages, the "other messages" mentioned in Determination Condition 3 can be a message other than that in the lower layers (RLC or MAC), or can be a message other than the ACK in the lower layers.

The "measured radio environment" mentioned in Determination Condition 4 refers to a condition that, for example, when the radio environment is better than a predetermined value, it can be estimated based on this condition that the RRCRelease has reached the UE 200A. Moreover, the predetermined value can be changed dynamically according to the resources allocated to the UE 200A and the like.

Upon determining that the RRCRelease has reached the UE 200A, the controlling unit 117 releases the context of the UE 200A. In other words, the controlling unit 117 releases the context of the UE 200A after the RRCRelease has reached the UE 200A. Alternatively, the controlling unit 117 can release the context of the UE 200A as soon as the RRCRelease reaches the UE 200A, or can release the context of the UE 200A after a predetermined time has elapsed after the RRCRelease has reached the UE 200A.

Furthermore, the RRCRelease is included in RRC-Container of the UE CONTEXT RELEASE COMMAND that is transmitted from the gNB-CU 120. The RRC-Container can be considered as an information element (IE).

Furthermore, after determining that the RRCRelease has reached the UE 200A, the controlling unit 117 can notify the gNB-CU 120 that the RRCRelease has reached the UE 200A. For performing the determination that the RRCRelease has reached the UE 200A itself and performing the determination to notify the gNB-CU 120 that the RRCRelease has reached the UE 200A, the same conditions shown in TABLE 1 can be used or different conditions can be used.

The controlling unit 117 can notify the gNB-CU 120 that the RRCRelease has reached the UE 200A by using one or more of the following notification methods.

TABLE 2

| | Notification Method |
|---|---|
| 1 | UE CONTEXT RELEASE COMPLETE corresponding to UE CONTEXT RELEASE COMMAND (with RRCRelease) |
| 2 | SCTP ACK |
| 3 | Using DDDS defined in NG-U |
| 4 | Other messages, or new message |

Specifically, the controlling unit 117 instructs to transmit a message for the transmitting unit 113. In the case of the UE CONTEXT RELEASE COMPLETE mentioned in Notification Method 1, when the RRCRelease does not reach the UE 200A, the controlling unit 117 can notify a Failure message.

In the case of ACK of Stream Control Transmission Protocol (SCTP) mentioned in Notification Method 2, the gNB-DU 110 (controlling unit 117) transmits to the gNB-CU 120 the SCTP ACK upon receiving F1 message via an ordinary F1 AP. However, the gNB-DU 110 can change the timing, and transmit the ACK to the gNB-CU 120 at a timing at which it is confirmed that the RRCRelease has reached the UE 200A.

Alternatively, the gNB-DU 110 (controlling unit 117) can transmit the SCTP ACK in two steps. The gNB-DU 110 returns the ACK once at the timing when the F1 message is received via the F1 AP, and then again returns the SCTP ACK at the timing at which it is confirmed that the RRCRelease has reached the UE 200A.

Use of Downlink Data Delivery Status (DDDS) mentioned in Notification Method 3 is realized by including in the DDDS the information that indicates the confirmation that the RRCRelease has reached the UE 200A.

(2.2) gNB-CU 120

Figure 4:
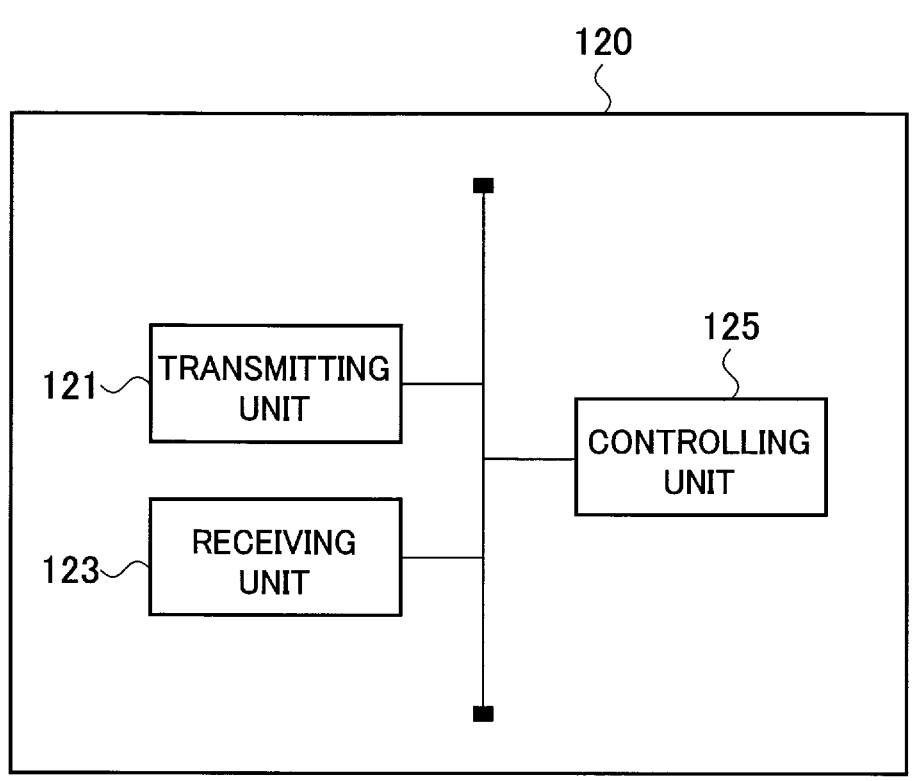
FIG. 4 is a functional block diagram of gNB-CU 120.

FIG. 4 is a functional block diagram of the gNB-CU 120. As shown in FIG. 4, the gNB-CU 120 includes a transmitting unit 121, a receiving unit 123, and a controlling unit 125.

The transmitting unit 121 transmits to the gNB-DU 110 various messages according to the F1 interface, specifically, the F1 AP. Particularly, in the present embodiment, the transmitting unit 121 transmits the UE CONTEXT RELEASE COMMAND to the gNB-DU 110 via which the release of the UE 200A context is instructed.

The receiving unit 123 receives from the gNB-DU 110 various messages according to the F1 AP. Particularly, in the present embodiment, the receiving unit 123 receives from the gNB-DU 110 the UE CONTEXT RELEASE COMPLETE that indicates that the release of the UE 200A context is completed.

The controlling unit 125 controls the operation of the gNB-CU 120. Particularly, in the present embodiment, the controlling unit 125 releases the context allocated to the UE 200A based on the UE CONTEXT RELEASE COMPLETE received from the gNB-DU 110.

Specifically, the controlling unit 125 can operate as explained below. For example, once the controlling unit 125 transmits the RRCRelease (RRC-Container including thereof; hereinafter the same) to the gNB-DU 110, the context of the UE 200A can be implicitly released by assuming that the RRCRelease has also reached the UE 200A.

Alternatively, the controlling unit 125 can release the context of the UE 200A after the predetermined time has elapsed after the RRCRelease is transmitted to the gNB-DU 110.

Moreover, the measurement start timing of the predetermined time can be any of the following.

TABLE 3

| | Measurement Start Timing |
|---|---|
| 1 | Timing at which RRC message (RRCRelease) is transmitted to DU |
| 2 | Timing at which it is detected that RRC message (RRCRelease) has reached DU |

In the case of Measurement Start Timing 2 mentioned above, the SCTP ACK and the like explained above can be used to detect that the RRCRelease has reached the gNB-DU. Moreover, in such a case, when the predetermined time has expired and a notification of confirmation that the RRCRelease has reached is received from the gNB-DU 110 before releasing the context of the UE 200A, the controlling unit 125 can release the context without waiting for expiration of the predetermined time.

However, the predetermined time can be an extremely short time (including "0" (zero)), or can be a considerably long time. Moreover, the resource allocation conflict can be avoided by retaining information on the context allocated to the UE 200A and deleting the same after a predetermined time period has elapsed.

Furthermore, the predetermined time period can be changed according to the transport characteristics (such as delay) of the gNB-DU 110 or the F1 interface.

Moreover, the controlling unit 125 can release the context of the UE 200A based on an explicit notification from the gNB-DU 110 that indicates that the RRCRelease has reached the UE 200A.

Furthermore, if the controlling unit 125 has transmitted the RRCRelease to the gNB-DU 110, the operation of releasing the context of the UE 200A performed by implicitly assuming that the RRCRelease has reached the UE 200A, and an operation of releasing the context of the UE 200A performed based on the explicit notification from the gNB-DU 110 that indicates that The RRCRelease has reached the UE 200A can be performed simultaneously.

(2.3) Modifications

Apart from the operations explained above, the gNB-DU 110 or the gNB-CU 120 can further operate as follows.

For example, the context of the UE 200A to be released can be the context that is entirely or partially relating to the corresponding UE. Moreover, the determination that the RRC message has reached the UE 200A is explained by assuming C-plane, however, it can be applied to U-plane.

Moreover, the gNB-CU 120 can operate as explained below. For example, the operation in which the context of the UE 200A is released by the operation of the controlling unit 125 can be performed based on a specific message transmitted by the gNB-CU 120 or all messages transmitted by the gNB-CU 120.

Furthermore, when the context of the UE 200A is released based on an explicit notification from the gNB-DU 110 that indicates that the RRCRelease has reached the UE 200A, the necessity of transmitting such a notification can be indicated to the gNB-DU 110 based on a unit (type) of the RRC message (for example, a message that includes the indication, or encapsulating and adding the indication to the header).

In such a case, the indication can be 1 bit such as polling, or can be the information for identifying the message (for example, sequence number (SN) of PDCP, RRC message type). Moreover, the necessity of transmitting the notification can be executed when there is such an explicit indication (notification), or, on the contrary, can be executed implicitly when there is no such indication.

Furthermore, the gNB-CU 120 can set the message to which the notification (control) is applied to be transmitted to the gNB-DU 110 semi-statically.

Moreover, similar control can be applied to the RRC messages other than the RRCRelease. For example, the control can be applied to all the RRC messages, or can be applied only to messages in which transmission thereof at the RRC level cannot be confirmed (for example, paging, system information, RRC connection reject, RRC connection suspend (transitioning to RRC inactive), RRC connection resume reject, and RRC connection re-establishment reject).

Furthermore, when releasing the context of the UE 200A based on the explicit notification from the gNB-DU 110 that indicates that the RRCRelease has reached the UE 200A, at the time of duplicating and transmitting the RRC message to the gNB-DU by using packet duplication that is used at the time of executing dual connectivity (DC), the gNB-CU 120 can transmit to the other gNB-DU the UE 200A context release command (UE context release command) that does not require waiting for the confirmation that the RRCRelease has reached the UE 200A when the confirmation that the RRCRelease has reached the UE 200A is notified from one gNB-DU. The gNB-CU 120 can release the context of the UE 200A at the same time.

(3) OPERATION OF RADIO COMMUNICATION SYSTEM

Operation of the radio communication system 10 is explained below. Specifically, processing of the RRC message executed between the gNB 100 constituted by the gNB-CU and the gNB-DU, and the UE 200A will be explained. As explained above, the RRC message is transmitted from the gNB-CU to the gNB-DU via UE CONTEXT RELEASE COMMAND stipulated in the F1 AP.

Figure 5:
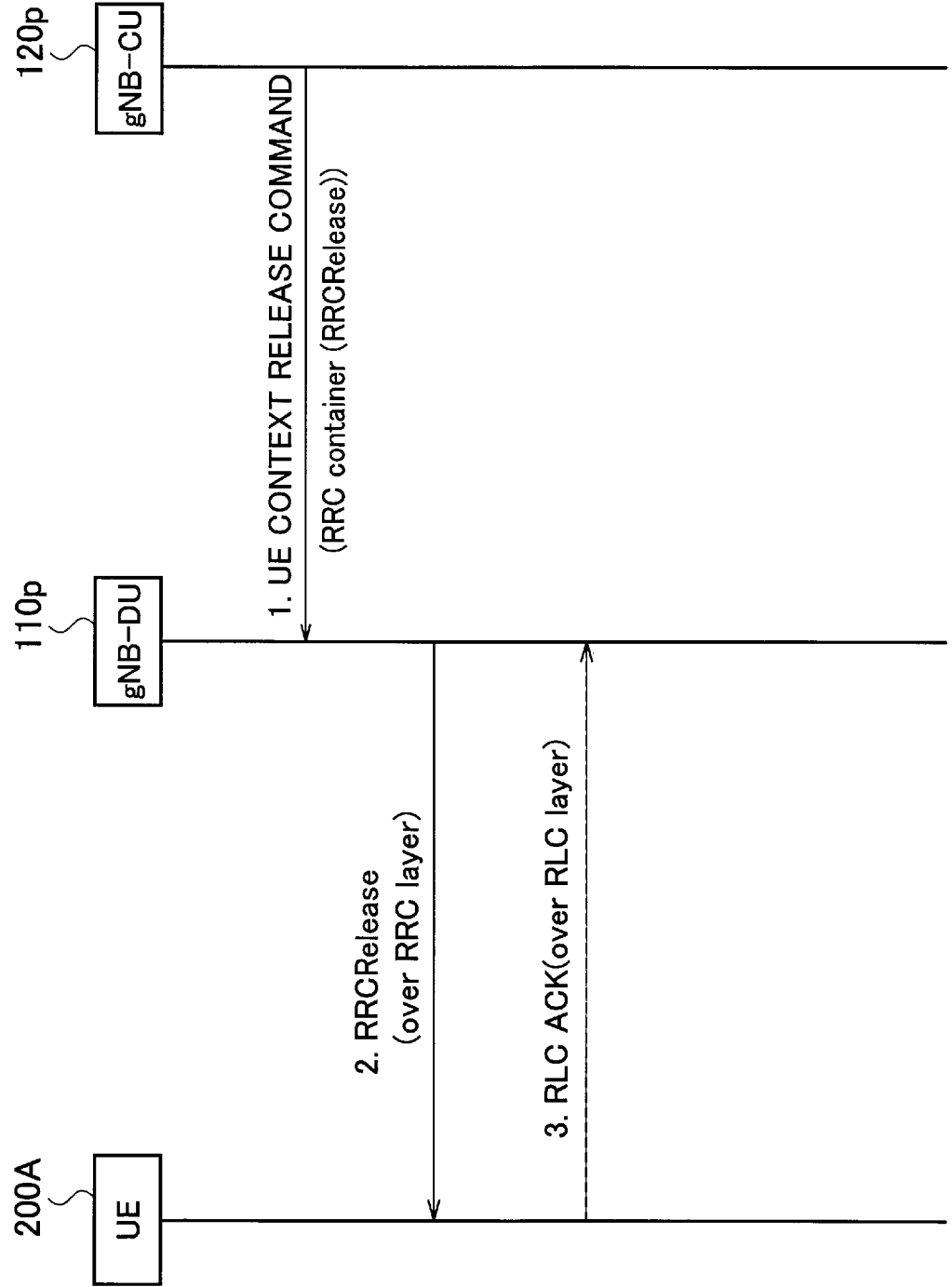
FIG. 5 is a diagram showing a communication sequence performed by the conventional gNB-CU and the gNB-DU upon receiving UE CONTEXT RELEASE COMMAND.

(3.1) Communication Sequence Performed Upon Receiving UE CONTEXT RELEASE COMMAND First, a communication sequence performed by a conventional gNB-CU and a gNB-DU upon receiving the UE CONTEXT RELEASE COMMAND will be explained. FIG. 5 shows a communication sequence performed by the conventional gNB-CU and the gNB-DU upon receiving UE CONTEXT RELEASE COMMAND.

As shown in FIG. 5, a conventional gNB-CU 120*p* transmits UE CONTEXT RELEASE COMMAND that includes RRC-Container to a conventional gNB-DU 110*p* (Step 1). The RRC-Container includes The RRCRelease.

Upon receiving the UE CONTEXT RELEASE COMMAND, the gNB-DU 110*p* forwards the contents (RRCRelease) of the RRC-Container to the UE 200A via the lower layers (such as RLC). In other words, the gNB-DU 110*p* forwards the RRCRelease transmitted over the RRC layer to the UE 200A (Step 2).

Upon receiving the RRCRelease, the UE 200A returns ACK over the RLC layer to the gNB-DU 110*p* that does not include the RRC (Step 3). The RLC ACK does not directly correspond to the reception of the RRCRelease, and at the most indicates the delivery confirmation of the RRCRelease in the RLC layer. Moreover, because the RLC ACK depends on the processing executed in the RLC, even if the RRCRelease reaches the UE 200A, the RLC ACK may not be returned to the gNB-DU 110*p* (as indicated with a dotted line in the figure) if the processing in the RLC fails.

The UE 200A that has received the RRCRelease does not particularly return the RRC message. This is because returning of the RRC message is not specified in the relevant 3GPP technical standard (TS).

Furthermore, the sequence itself shown in FIG. 5 is the same for the gNB-DU 110 and the gNB-CU 120 according to the present embodiment.

(3.2) RRC Message Processing According to Conventional Example

Figure 6:
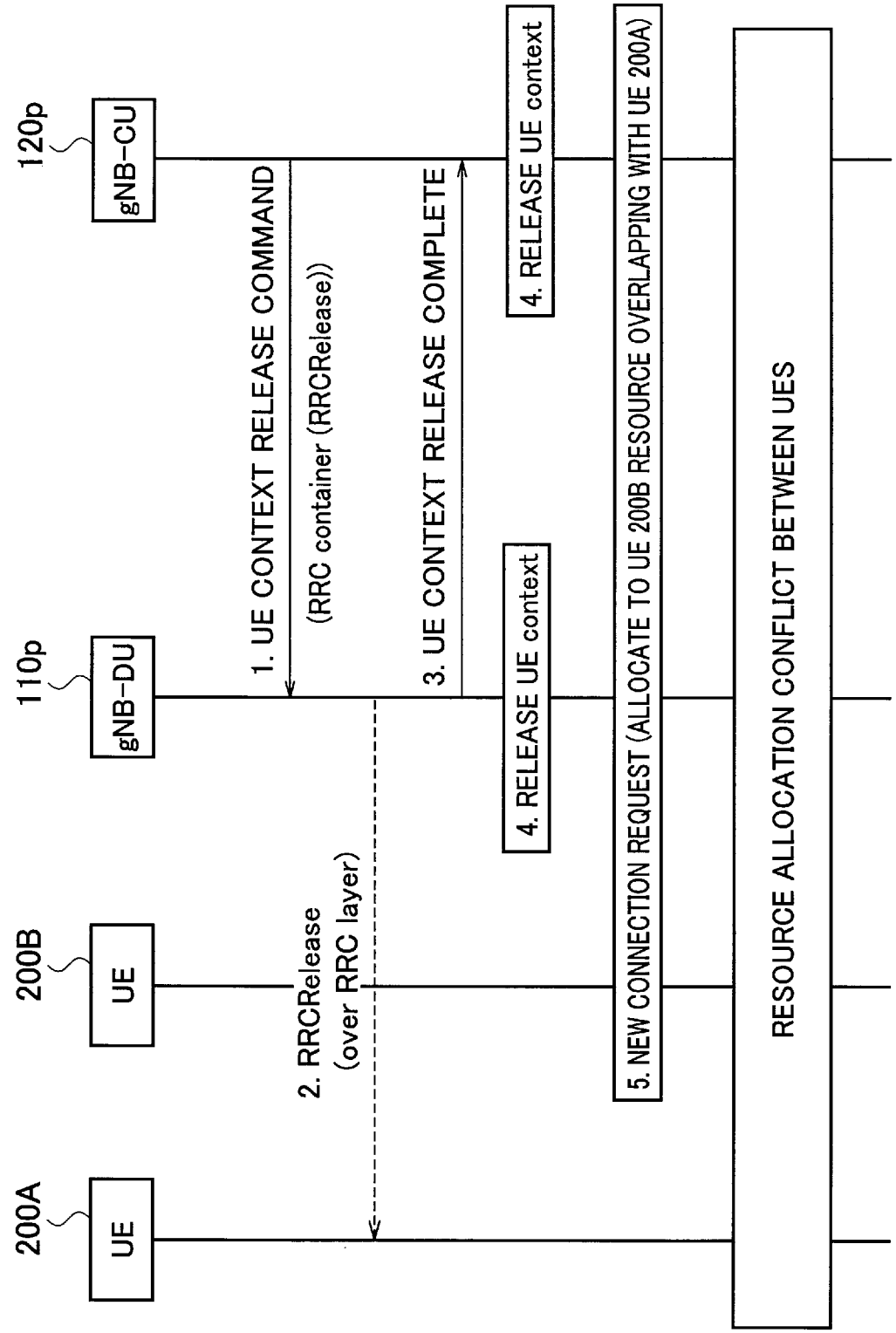
FIG. 6 is a sequence of RRC message processing executed by the conventional gNB-CU and the gNB-DU.

FIG. 6 shows RRC message processing executed by a conventional gNB-CU and a gNB-DU. Specifically, in FIG. 6, an operation example in which UE context is released by the conventional gNB-CU and the gNB-DU, and resources are allocated to the UE is shown.

As shown in FIG. 6, the gNB-CU 120*p* transmits to the gNB-DU 110*p* the UE CONTEXT RELEASE COMMAND that includes RRC-Container (Step 1). Moreover, the gNB-DU 110*p* forwards The RRCRelease to the UE 200A as is (Step 2). Such a sequence is similar to that shown in FIG. 5.

Based on the reception of the UE CONTEXT RELEASE COMMAND, the gNB-DU 110*p* returns UE CONTEXT RELEASE COMPLETE to the gNB-CU 120*p* (Step 3).

The gNB-DU 110*p* and the gNB-CU 120*p* release the context of the UE 200A based on the transmission and reception of the UE CONTEXT RELEASE COMMAND and the UE CONTEXT RELEASE COMPLETE (Step 4). Accordingly, all the signaling and resources relating to the UE 200A are released.

At this step, if the RRCRelease has not reached the UE 200A, that is, if the UE 200A fails to successfully receive the RRCRelease, the UE 200A maintains a connection in the RRC (RRC connection) and attempts to continue the communication by using the allocated resources.

Subsequently, the gNB-CU 120*p* processes a new request to connect with the UE 200B via the RRC (Step 5). At this step, because the context of the UE 200A has already been released in the gNB-CU 120*p*, there is a possibility that resources overlapping with the UE 200A are allocated to the UE 200B.

As a result, there is a possibility that a resource allocation conflict occurs between the UE 200A and the UE 200B. When such a resource allocation conflict occurs, there is a possibility that the communication quality deteriorates because of the interference between the UE 200A and the UE 200B, and the signals between the UE 200A and the UE 200B cannot be identified.

(3.3) RRC Message Processing According to the Present Embodiment

Figure 7:
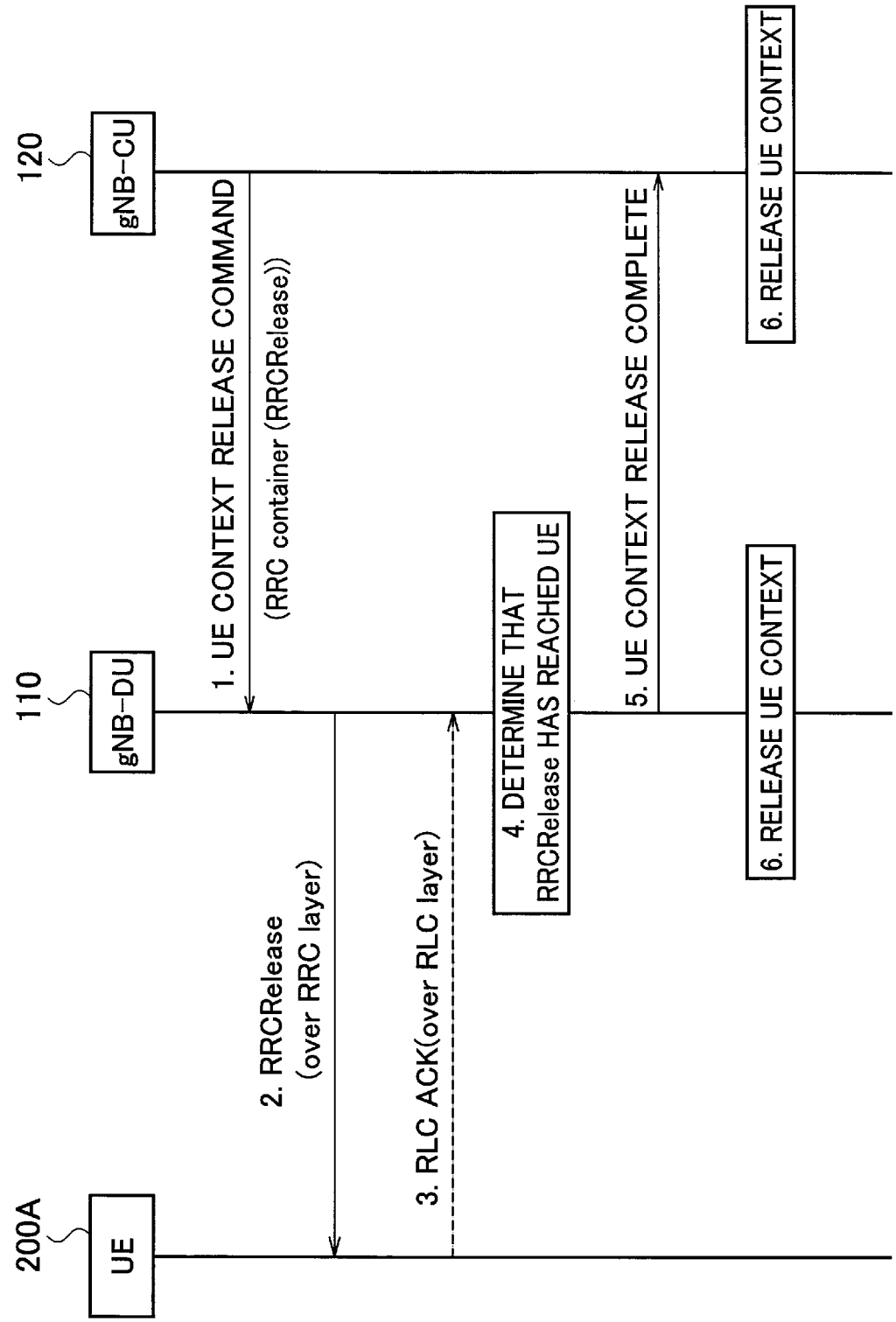
FIG. 7 is a sequence of RRC message processing executed by a gNB-CU and a gNB-DU according to the present embodiment.

FIG. 7 shows a sequence of RRC message processing executed by the gNB-CU and the gNB-DU according to the present embodiment. Specifically, in FIG. 7, an operation example in which the UE context is released by the gNB-CU and the gNB-DU according to the present embodiment is shown. A part of the communication sequence that differs from that shown in FIG. 5 and a part that differs from the operation example shown in FIG. 6 will be mainly explained below.

Steps 1 to 3 shown in FIG. 7 are the same as Steps 1 to 3 shown in FIG. 5. As explained above, there is also a possibility that the RLC ACK is not returned to the gNB-DU 110.

Based on the determination conditions explained above (see TABLE 1), the gNB-DU 110 determines that the RRCRelease has reached the UE 200A (Step 4).

Based on the determination result that the RRCRelease has reached the UE 200A, the gNB-DU 110 returns the UE CONTEXT RELEASE COMPLETE to the gNB-CU 120 (Step 5).

The gNB-DU 110 and the gNB-CU 120 release the context of the UE 200A based on the transmission and reception of the UE CONTEXT RELEASE COMMAND and the UE CONTEXT RELEASE COMPLETE (Step 6).

In other words, when UE CONTEXT RELEASE COMMAND includes RRC-Container (precisely, RRC-Container-IE), and after the RRC message (in the present embodiment, RRCRelease) included in the RRC-Container is successfully delivered to the UE 200A, the gNB-DU 110 releases all the resources including signaling and the user data transport resources relating to the UE 200A, and returns the UE CONTEXT RELEASE COMPLETE.

On the other hand, if the UE CONTEXT RELEASE COMMAND does not include the RRC-Container, as soon as the UE CONTEXT RELEASE COMMAND is received, the gNB-DU 110 can return the UE CONTEXT RELEASE COMPLETE, and release the resources and the like relating to the UE 200A.

(4) EFFECTS AND ADVANTAGES

The following operational effects can be obtained with the embodiments explained above. Specifically, when the RRCRelease reaches the UE 200A (or UE 200B; hereinafter the same), the gNB 100 (gNB-DU 110) transmits to the gNB-CU 120 the context release completion message of the UE 200A, specifically, the UE CONTEXT RELEASE COMPLETE.

Therefore, when the RRCRelease does not reach the UE 200A, occurrence of the resource allocation conflict can be reliably avoided by allocating the released resources of the UE 200A to other UEs such as the UE 200B.

In other words, similar to the gNB-DU 110 and the gNB-CU 120 (radio access system), in a configuration in which the radio resource control layer and the layers below thereof are split and included in different communication devices, it is possible to reliably avoid a resource allocation conflict that arises when the user equipment cannot normally receive the message of the radio resource control layer.

As explained above, because the UE 200A maintains the connection (RRC connection) in the RRC and attempts to continue the communication by using the allocated resources when the RRCRelease does not reach the UE 200A, that is, when the UE 200A fails to successfully receive the RRCRelease, there is a possibility that an interference and the like may occur between the UE 200A and the UE 200B, and the communication quality may deteriorate.

Moreover, when the ID is duplicated, there is possibility that signals between the UE 200A and the UE 200B cannot be recognized. With the gNB-DU 110 and the gNB-CU 120, deterioration of the communication quality and the failure to identify the signals can be prevented.

In the 3GPP specification (TS 38.473 V15.2.1) at present, it is assumed that, upon receiving the UE CONTEXT RELEASE COMMAND, the gNB-DU 110 releases the UE context and returns the UE CONTEXT RELEASE COMPLETE. As a result, the problem of resource allocation conflict explained above can occur.

Particularly, in the case of the RRCRelease, because, unlike the RRC reconfiguration and the like, the UE does not particularly return the RRC message, the gNB-CU 120 that includes the RRC cannot recognize whether the UE 200A has successfully received the RRCRelease over the RRC layer. The embodiments explained above solve such a problem.

In the present embodiment, the gNB-DU 110 can determine that the RRCRelease has successfully reached the UE 200A based on a response message (RLC ACK) from the UE 200A in lower layers (for example, the RLC). Furthermore, when it is determined that the RRCRelease has reached the UE 200A, the gNB-DU 110 transmits (returns) UE CONTEXT RELEASE COMPLETE to the gNB-CU 120.

Therefore, by using the response message of the lower layers, the gNB-DU 110 can determine that the RRCRelease has successfully reached the UE 200A with more accuracy.

(5) OTHER EMBODIMENTS

Although the contents of the present invention have been described by way of the embodiments, it is obvious to those skilled in the art that the present invention is not limited to what is written here and that various modifications and improvements thereof are possible.

For example, in the present embodiment explained above, Higher Layer Split (HLS) of a so-called CU-DU in which lower layers such as the RLC are provided in the gNB-DU 110 and upper layers above the RRC are provided in the gNB-CU 120 has been explained as an example. However, the present invention can be similarly applied when a node (device) that hosts the RRC and a node that forwards an RRC message to UE are logically or physically separated.

Moreover, the block diagrams used for explaining the embodiments (FIGS. 3, 4) show blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 8:
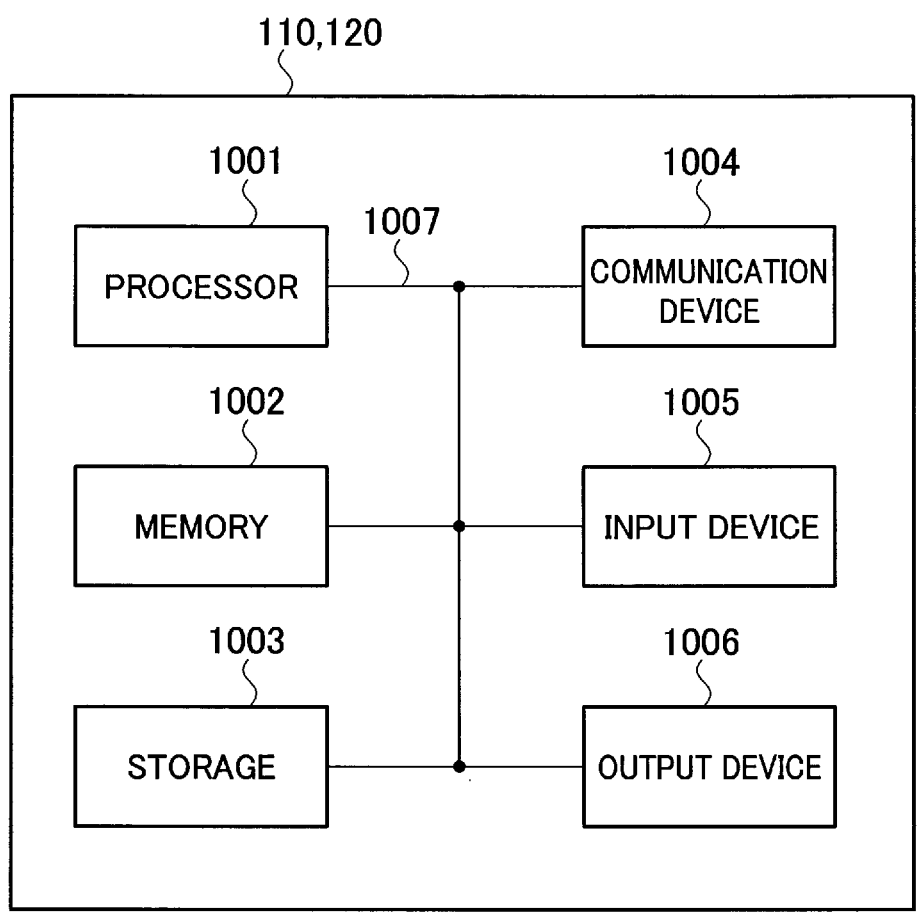
FIG. 8 is a diagram showing an example of a hardware configuration of the gNB-DU 110 and the gNB-CU 120.

Furthermore, the gNB-DU 100 and the gNB-CU 120 (devices) explained above can function as a computer that performs the processing of the radio communication method of the present disclosure. FIG. 8 is a diagram showing an example of a hardware configuration of the devices. As shown in FIG. 8, the device can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including apart of the devices.

The functional blocks of the device can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the device by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Furthermore, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, UltraMobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

INDUSTRIAL APPLICABILITY

According to the embodiments explained above, the present invention is useful in that, it is possible to reliably avoid the resource allocation conflict that arises when a user equipment cannot normally receive a message of the radio resource control layer in a configuration in which the radio resource control layer and the layers below thereof are split and included in different communication devices.

EXPLANATION OF REFERENCE NUMERALS

10 RADIO COMMUNICATION SYSTEM
20 NG-RAN
100 gNB
110, 110p gNB-DU
111 RADIO COMMUNICATION UNIT
113 TRANSMITTING UNIT
115 RECEIVING UNIT
117 CONTROLLING UNIT
120, 120p gNB-CU
121 TRANSMITTING UNIT
123 RECEIVING UNIT
125 CONTROLLING UNIT
200A, 200B UE
1001 PROCESSOR
1002 MEMORY
1003 STORAGE
1004 COMMUNICATION DEVICE
1005 INPUT DEVICE
1006 OUTPUT DEVICE
1007 BUS

The invention claimed is:

1. A radio access system comprising:
a first communication device that executes communication with a user equipment via lower layers; and
a second communication device that is connected to the first communication device and executes communication with the user equipment via a radio resource control layer that is above the lower layers, wherein
the first communication device includes a transmitter that transmits to the second communication device a context release completion message of the user equipment when a connection release message in the radio resource control layer reaches the user equipment,
the connection release message is encapsulated in a context release command message when transmitted from the second communication device to the first communication device, before being forwarded to the user equipment, and
the second communication device includes a processor that releases a context allocated to the user equipment based on the context release completion message.

2. The radio access system as claimed in claim 1, wherein the first communication device includes a processor that determines that the connection release message has successfully reached the user equipment based on a response message from the user equipment in the lower layer, and
the transmitter transmits the context release completion message when the processor of the first communication device determines that the connection release message has reached the user equipment.

3. A communication device, wherein
the communication device executes communication with a user equipment via a lower layer, and connects to another communication device that executes communication with the user equipment via a radio resource control layer that is above the lower layer, and
the communication device includes a transmitter that transmits to the other communication device a context release completion message of the user equipment when a connection release message in the radio resource control layer reaches the user equipment,
wherein the connection release message is encapsulated in a context release command message when transmitted from the other communication device to the communication device, before being forwarded to the user equipment.

* * * * *